US010171778B2

(12) United States Patent
Huang et al.

(10) Patent No.: US 10,171,778 B2
(45) Date of Patent: Jan. 1, 2019

(54) LIQUID COOLING APPARATUS

(71) Applicant: COOLER MASTER CO., LTD., New Taipei (TW)

(72) Inventors: Shih-Wei Huang, New Taipei (TW); Shui-Fa Tsai, New Taipei (TW)

(73) Assignee: COOLER MASTER CO., LTD., New Taipei (TW)

( * ) Notice: Subject to any disclaimer, the term of this patent is extended or adjusted under 35 U.S.C. 154(b) by 0 days.

(21) Appl. No.: 15/614,091

(22) Filed: Jun. 5, 2017

(65) Prior Publication Data
US 2017/0272712 A1   Sep. 21, 2017

Related U.S. Application Data

(63) Continuation-in-part of application No. 15/014,005, filed on Feb. 2, 2016.

(30) Foreign Application Priority Data

Nov. 24, 2015 (TW) .............................. 104218884 U

(51) Int. Cl.
*H04N 9/31* (2006.01)
*G02B 26/08* (2006.01)
*F28F 3/02* (2006.01)
*F28F 3/04* (2006.01)
*F28F 3/12* (2006.01)
(Continued)

(52) U.S. Cl.
CPC ............. *H04N 9/3144* (2013.01); *F28F 3/02* (2013.01); *F28F 3/022* (2013.01); *F28F 3/048* (2013.01); *F28F 3/12* (2013.01); *F28F 13/003* (2013.01); *G02B 7/1815* (2013.01); *G02B 26/0833* (2013.01); *F28D 2021/0029* (2013.01);
(Continued)

(58) Field of Classification Search
CPC .... H04N 9/3144; H04N 9/31; G02B 26/0833; G03B 21/16
USPC .......................................................... 353/54
See application file for complete search history.

(56) References Cited

U.S. PATENT DOCUMENTS 6,591,897 B1 *   7/2003  Bhatti ................. H01L 23/3677
                                                           165/185
2008/0216991 A1 *  9/2008  Oikawa ..................... G06F 1/20
                                                           165/80.3

FOREIGN PATENT DOCUMENTS

JP   2005-338715    * 12/2005  ............. G03B 21/16
JP   2005-338715 A   12/2005

OTHER PUBLICATIONS

Machine Translation of Japanese Document 2005-338715.*

* cited by examiner

*Primary Examiner* — Steven H Whitesell Gordon
*Assistant Examiner* — Jerry Brooks
(74) *Attorney, Agent, or Firm* — Muncy, Geissler, Olds & Lowe, P.C.

(57) ABSTRACT

A liquid cooling apparatus has a chassis, a cover mounted on the chassis, and a dividing structure disposed in an inner chamber defined between the chassis and the cover. The dividing structure divides the inner chamber into a liquid inlet compartment and a liquid outlet compartment. The liquid inlet compartment communicates with the liquid outlet compartment via the recess. The liquid cooling apparatus can be installed on a first panel with the boss of the chassis mounted through a through hole of the first panel and thermally attached to a heat source on a second panel. A working fluid that flows into the liquid inlet compartment is forced to flow into the recess before flowing to the liquid outlet compartment by the dividing structure. Accordingly, (Continued)

heat generated by the heat source can be effectively dissipated.

7 Claims, 14 Drawing Sheets

(51) Int. Cl.
  *F28F 13/00* (2006.01)
  *G02B 7/18* (2006.01)
  *G03B 21/16* (2006.01)
  *F28D 21/00* (2006.01)
(52) U.S. Cl.
  CPC ....... *F28F 2230/00* (2013.01); *F28F 2275/20* (2013.01); *G03B 21/16* (2013.01)

LIQUID COOLING APPARATUS

CROSS-REFERENCE TO RELATED APPLICATIONS

This application is a Continuation-in-Part of co-pending application Ser. No. 15/014,005, filed on Feb. 2, 2016, for which priority is claimed under 35 U.S.C. § 120; and this application claims priority of application Ser. No. 10/421,884 filed in Taiwan on Nov. 24, 2015 under 35 U.S.C. § 119;), the entire contents of all of which are hereby incorporated by reference.

BACKGROUND OF THE INVENTION

1. Field of the Invention

The present invention relates to a heat dissipating structure, and more particularly to a liquid cooling apparatus.

2. Description of the Prior Art(s)

Projector is a display device that has a special structured projection tube or liquid crystal display (LCD) panel operating in coordination with an optical system to amplify an image and project the amplified image onto a screen. However, since electronic components of the optical system usually generate high temperature heat, it is necessary to have a water cooling apparatus to dissipate the heat generated by the electronic components.

Moreover, some of the electronic components in the projector are installed in recessed areas. For example, a Digital Micro-Mirror Device (DMD) chip is exposed in an opening of a circuit board. Therefore, a small-sized boss that is formed on and protrudes from a bottom of a conventional water cooling apparatus is required. The boss protrudes into the opening of the circuit board and is thermally attached to the DMD chip. Thus, the boss conducts heat generated by the DMD chip to the water cooling apparatus for the purpose of dissipating the heat. However, the boss is formed with a solid structure with poor thermal conductivity and poor heat exchange efficiency.

To overcome the shortcomings, the present invention provides a liquid cooling apparatus to mitigate or obviate the aforementioned problems.

SUMMARY OF THE INVENTION

The main objective of the present invention is to provide a liquid cooling apparatus that has a chassis, a cover, and a dividing structure.

The chassis has a boss, a recess, and a heat dissipating structure. The boss is formed on and protrudes from a lower surface of the chassis. The recess is forming in an upper surface of the chassis and is recessed into the boss. The heat dissipating structure is disposed in the recess.

The cover is mounted on the upper surface of the chassis and covers the chassis. An inner chamber is defined between the chassis and the cover. The cover has a liquid inlet channel with an interior inlet and a liquid outlet channel with an interior outlet. The interior inlet and the interior outlet communicates with the inner chamber.

The dividing structure is disposed in the inner chamber, is attached to the inner surface of the cover, and protrudes to abut the top of the heat dissipating structure. The dividing structure divides the inner chamber into a liquid inlet compartment and a liquid outlet compartment. The liquid inlet compartment communicates with the liquid outlet compartment via the recess.

The liquid cooling apparatus can be installed on a first panel with the boss of the chassis mounted through a through hole of the first panel and thermally attached to a heat source on a second panel. A working fluid that flows into the liquid inlet compartment is forced to flow into the recess before flowing to the liquid outlet compartment by the dividing structure. Accordingly, heat generated by the heat source can be effectively dissipated.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
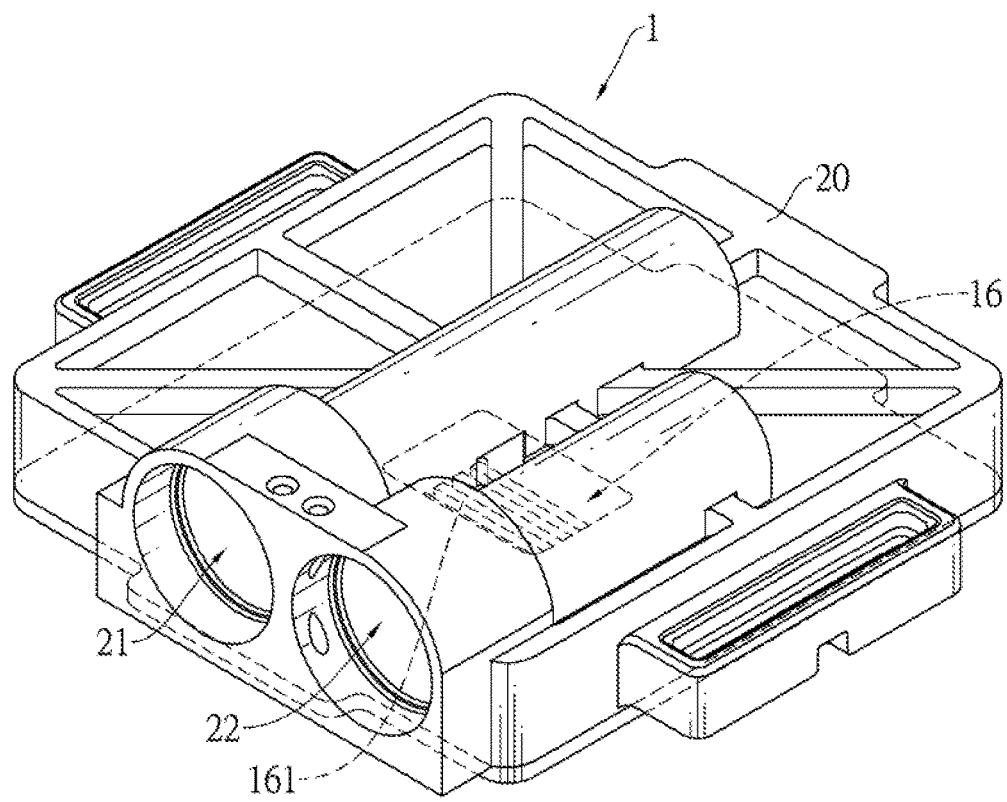
FIG. 1 is a perspective view of a first embodiment of a liquid cooling apparatus in accordance with the present invention.
Figure 2:
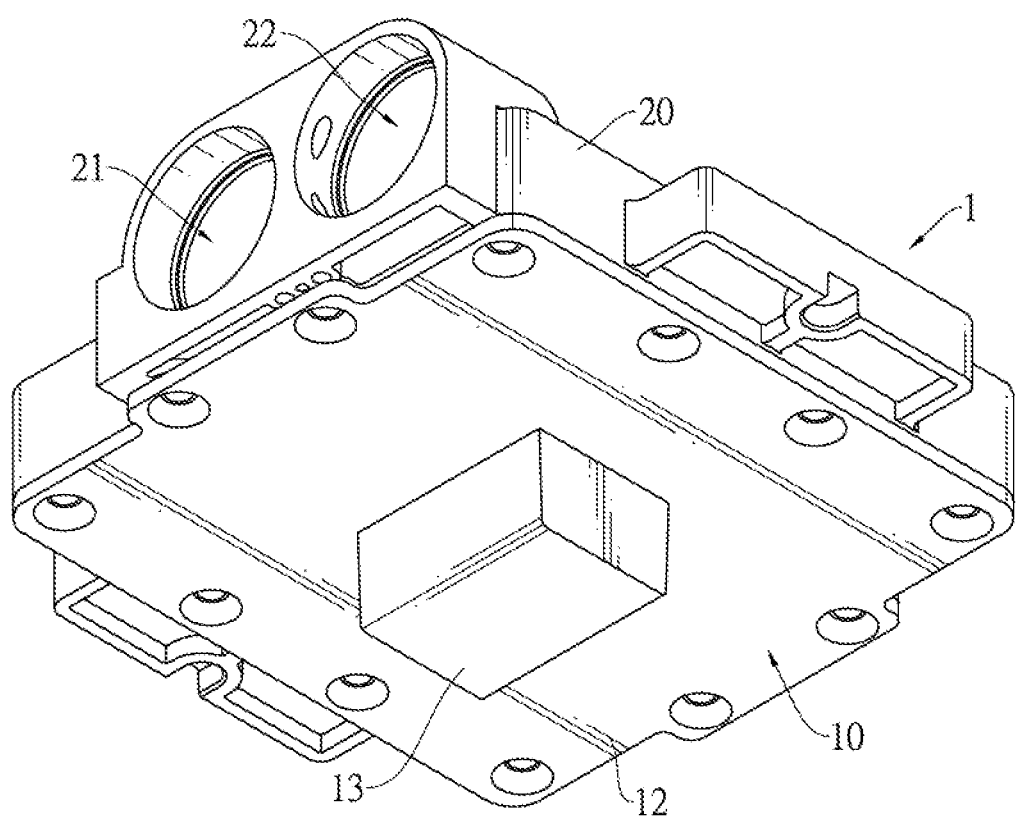
FIG. 2 is another perspective view of the liquid cooling apparatus in FIG. 1.

With reference to FIGS. 1 and 2, a first embodiment of a liquid cooling apparatus 1 in accordance with the present invention comprises a chassis 10, a cover 20, and a dividing structure 40.

Figure 3:
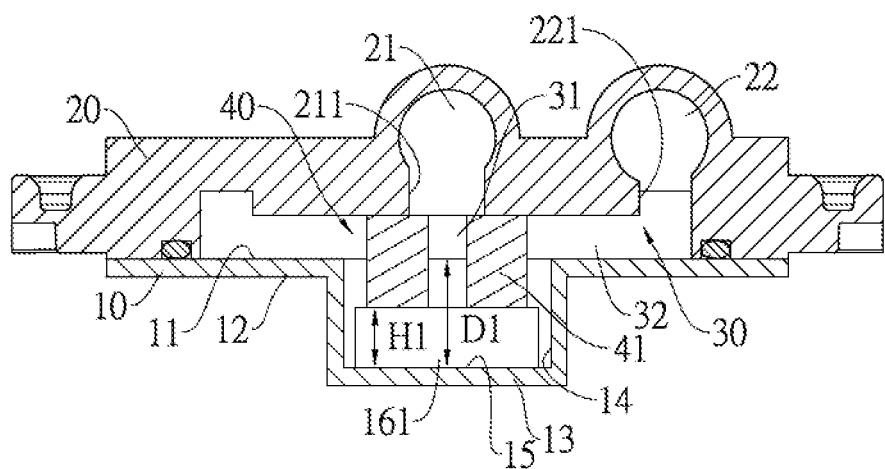
FIG. 3 is a cross-sectional side view of the liquid cooling apparatus in FIG. 1.

With further reference to FIG. 3, the chassis 10 is made of high thermal conductivity material, such as cooper, aluminum, and the like. The chassis 10 has an upper surface 11, a lower surface 12, a boss 13, a recess 14, an inner bottom 15, and a heat dissipating structure 16. The boss 13 is formed on and protrudes from the lower surface 12 of the chassis 10. The recess 14 is formed in the upper surface 11 of the chassis 10 and is recessed into the boss 13. The inner bottom 15 is defined in the recess 14. The heat dissipating structure 16 is disposed on the inner bottom 15 in the recess 14 and has a top.

Preferably, an area of a cross-section of the boss 13 is less than 50% of an area of the lower surface 12 of the chassis 10, wherein the cross-section of the boss 13 is defined parallel to the lower surface 12 of the chassis 10.

The cover 20 is mounted on the upper surface 11 of the chassis 10 and covers the chassis 10. An inner chamber 30 is defined between the chassis 10 and the cover 20. The cover 20 has an inner surface, a liquid inlet channel 21, and a liquid outlet channel 22. The inner surface of the cover 20 faces the upper surface 11 of the chassis 10. The liquid inlet channel 21 is defined through the cover 20 and has an interior inlet 211. The interior inlet 211 communicates with the inner chamber 30. The liquid outlet channel 22 is defined through the cover 20 and has an interior outlet 221. The interior outlet 221 communicates with the inner chamber 30.

The dividing structure 40 is disposed in the inner chamber 30, is attached to the inner surface of the cover 20, and protrudes into the recess 14 to abut the top of the heat dissipating structure 16 in the recess 14. The dividing structure 40 divides the inner chamber 30 into a liquid inlet compartment 31 and a liquid outlet compartment 32. The liquid inlet compartment 31 directly communicates with the interior inlet 211 of the liquid inlet channel 21. The liquid outlet compartment 32 directly communicates with the interior outlet 221 of the liquid outlet channel 22. The liquid inlet compartment 31 communicates with the liquid outlet compartment 32 via the recess 14.

Figure 4:
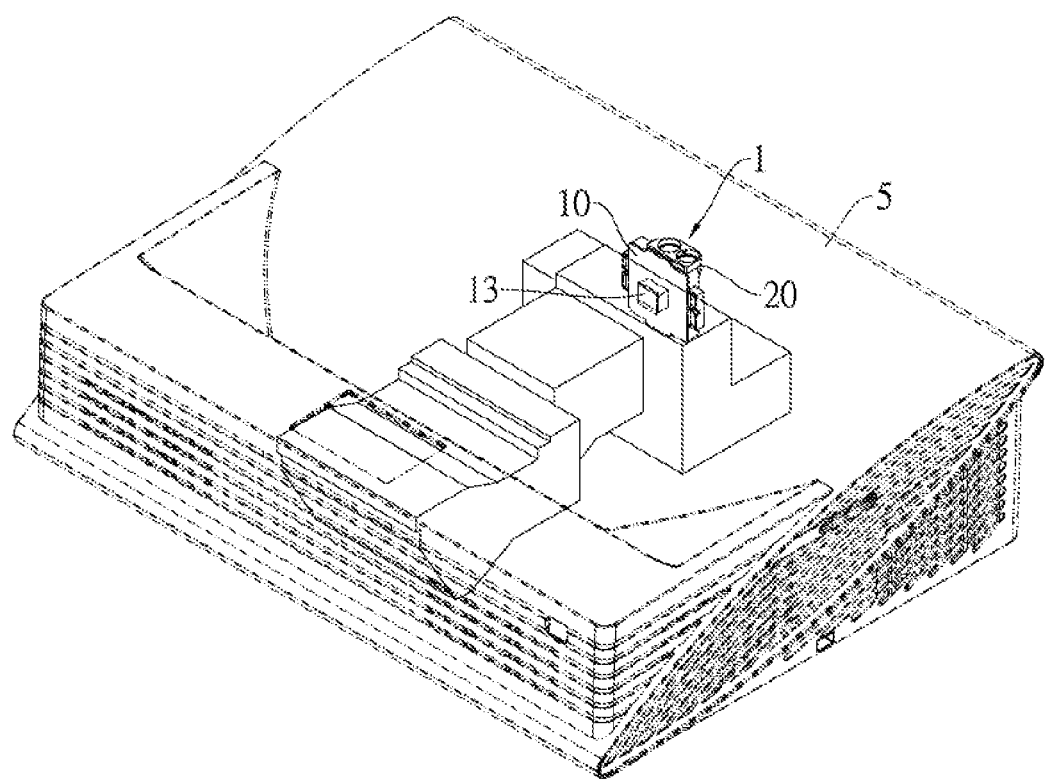
FIG. 4 is an operational perspective view of the liquid cooling apparatus in FIG. 1, showing the liquid cooling apparatus is applied in a projector.
Figure 5:
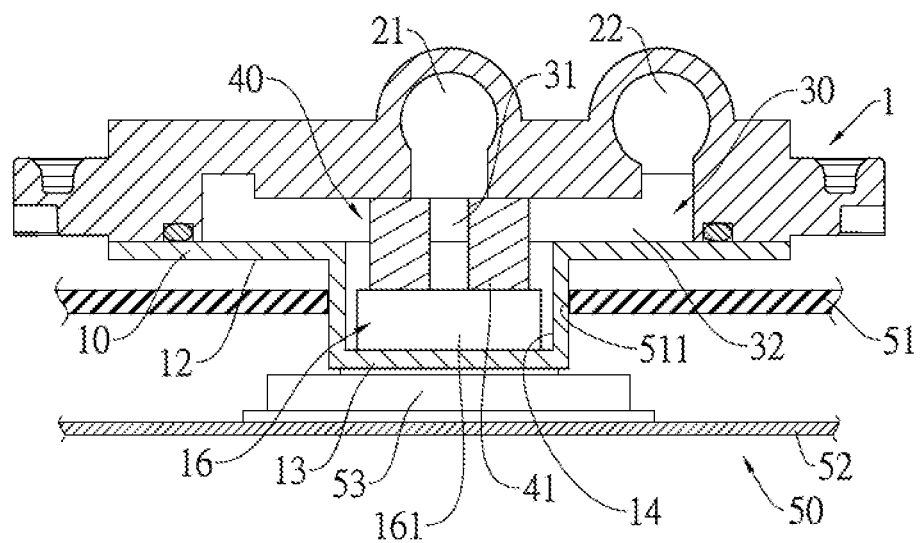
FIG. 5 is an operational cross-sectional side view of the liquid cooling apparatus in FIG. 1, showing the liquid cooling apparatus is applied in the projector.

With further reference to FIGS. 4 and 5, the liquid cooling apparatus 1 of the present invention may be applied to a projector module 50 of a projector 5. The projector module 50 includes a first panel 51, a second panel 52, and a heat source 53. The first panel 51 and the second panel 52 are placed at intervals. At least one of the first panel 51 and the second panel 52 may be a circuit board. The first panel 51 has a through hole 511 formed through the first panel 51. The heat source 53 is installed on the second panel 52 and corresponds in position to the through hole 511 of the first panel 51. Specifically, the heat source 53 may be a Digital Micro-Mirror Device (DMD) chip.

The liquid cooling apparatus 1 is installed on the first panel 51 with the boss 13 of the chassis 10 mounted through the through hole 511 of the first panel 51 and thermally attached to the heat source 53. Since the area of the cross-section of the boss 13 is less than 50% of the area of the lower surface 12 of the chassis 10, the liquid cooling apparatus 1 can be stably mounted on the first panel 51.

During operation, a working fluid, such as refrigerant or water, flows through the liquid inlet channel 21 to the liquid inlet compartment 31 of the inner chamber 30, and the dividing structure 40 guides the working fluid to flow into the recess 14. In the recess 14, heat generated by the heat source 53 is conducted through the boss 13 and the heat dissipating structure 16 to the working fluid. Then the working fluid flows out of the recess 14 to the liquid outlet compartment 32 of the inner chamber 30 and flows through the liquid outlet channel 22 to flow out of the liquid cooling apparatus 1 and to carry the heat away from the liquid cooling apparatus 1.

As shown in FIG. 5, with the dividing structure 40 dividing the inner chamber 30 into the liquid inlet compartment 31 and the liquid outlet compartment 32, the working fluid is forced to flow into the recess 14, so as to effectively dissipate the heat generated by the heat source 53.

As shown in FIG. 3, in the first embodiment, the heat dissipating structure 16 includes multiple plate fins 161. Each of the plate fins 161 has a distal edge. The distal edges of the plate fins 161 form the top of the heat dissipating structure 16. The distal edge of each of the fins 161 is lower than the upper surface 11 of the chassis 10, i.e. a height H1 of the plate fin 161 is less than a depth D1 of the recess 14. The interior inlet 211 of the liquid inlet channel 21 corresponds in position to the recess 14. The dividing structure 40 includes two protruding walls 41. The two protruding walls 41 are oppositely disposed beside the interior inlet 211 of the liquid inlet channel 21 and protrude into the recess 14 to abut the distal edges of the plate fins 161. One of the protruding walls 41 is disposed between the interior inlet 211 of the liquid inlet channel 21 and the interior outlet 221 of the liquid outlet channel 22. The liquid inlet compartment 31 is defined between the two protruding walls 41.

Figure 6:
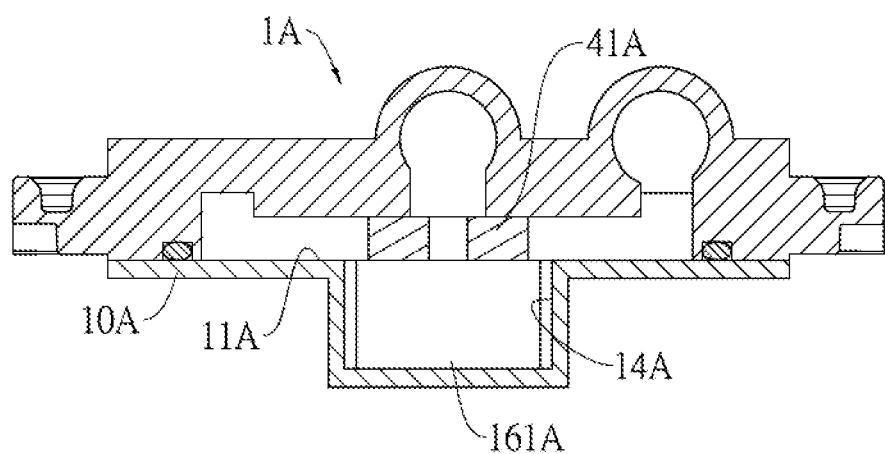
FIG. 6 is a cross-sectional side view of a second embodiment of a liquid cooling apparatus in accordance with the present invention.

With further reference to FIG. 6 that shows a second embodiment of a liquid cooling apparatus 1A in accordance with the present invention, a configuration of the second embodiment is substantially the same as a configuration of the first embodiment, except that the distal edge of each of the plate fins 161A is flush with the upper surface 11A of the chassis 10A, and the protruding walls 41A are free from protruding into the recess 14A.

Figure 7:
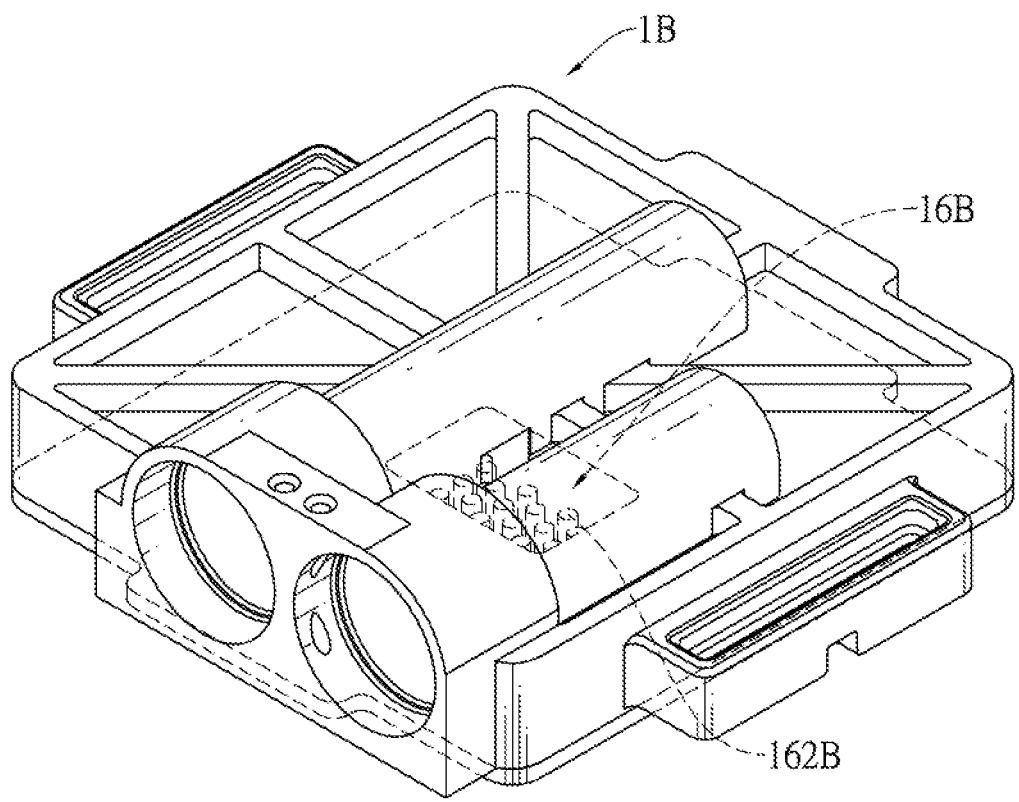
FIG. 7 is a perspective view of a third embodiment of a liquid cooling apparatus in accordance with the present invention.
Figure 8:
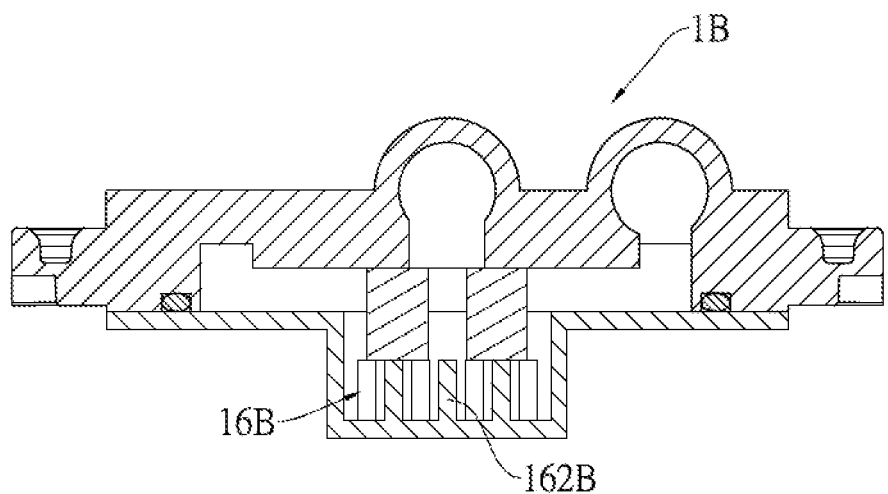
FIG. 8 is a cross-sectional side view of the liquid cooling apparatus in FIG. 7.

With further reference to FIGS. 7 and 8 that shows a third embodiment of a liquid cooling apparatus 1B in accordance with the present invention, a configuration of the third embodiment is substantially the same as the configuration of the first embodiment, except that the heat dissipating structure 16B includes multiple pin fins 162B.

Figure 9:
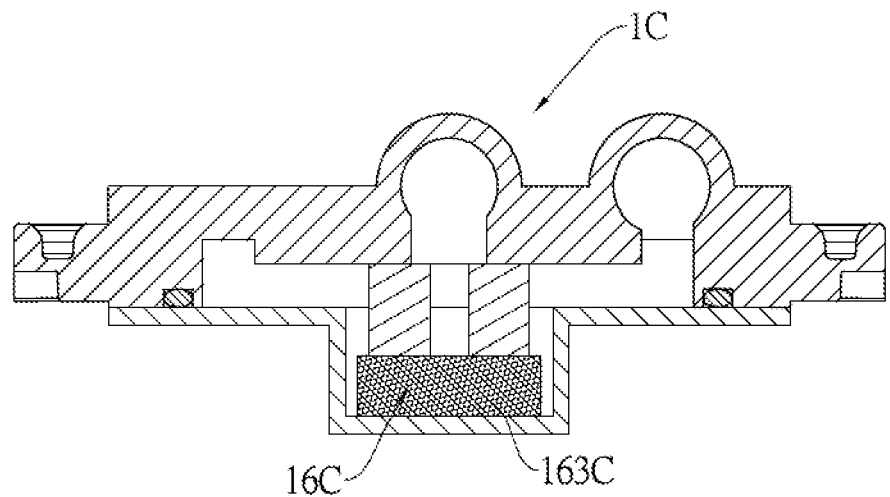
FIG. 9 is a cross-sectional side view of a fourth embodiment of a liquid cooling apparatus in accordance with the present invention.

With further reference to FIG. 9 that shows a fourth embodiment of a liquid cooling apparatus 1C in accordance with the present invention, a configuration of the fourth embodiment is substantially the same as the configuration of the first embodiment, except that the heat dissipating structure 16C is formed as a metal foam with multiple pores 163C. Thus, the working fluid can flow through the heat dissipating structure 16C via the pores 163C, so as to dissipate the heat.

Figure 10:
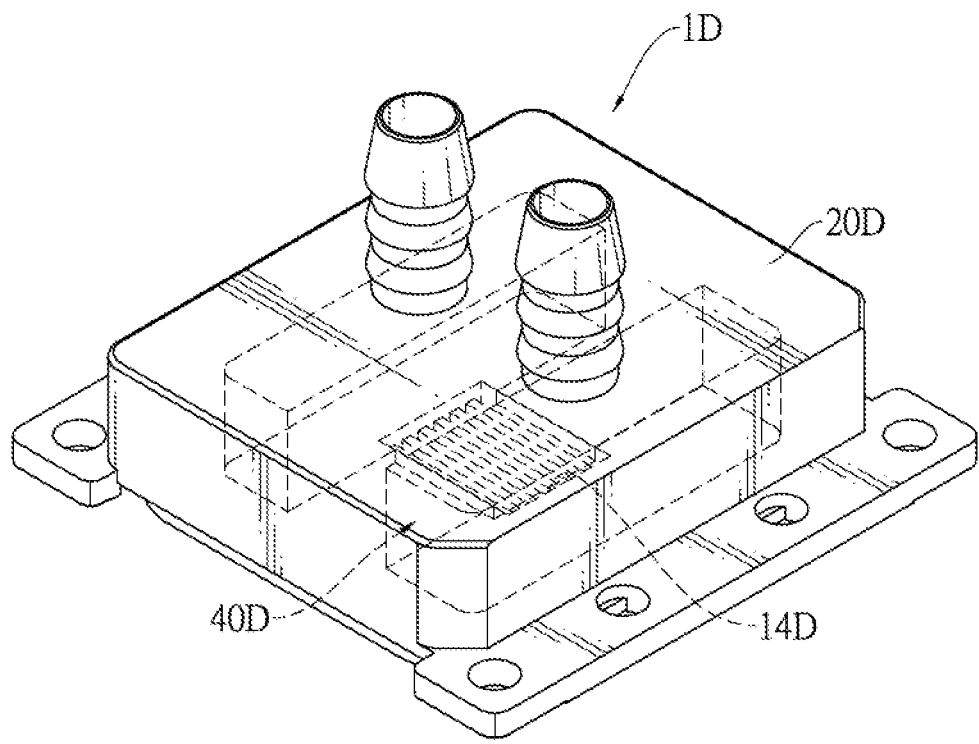
FIG. 10 is a perspective view of a fifth embodiment of a liquid cooling apparatus in accordance with the present invention.
Figure 11:
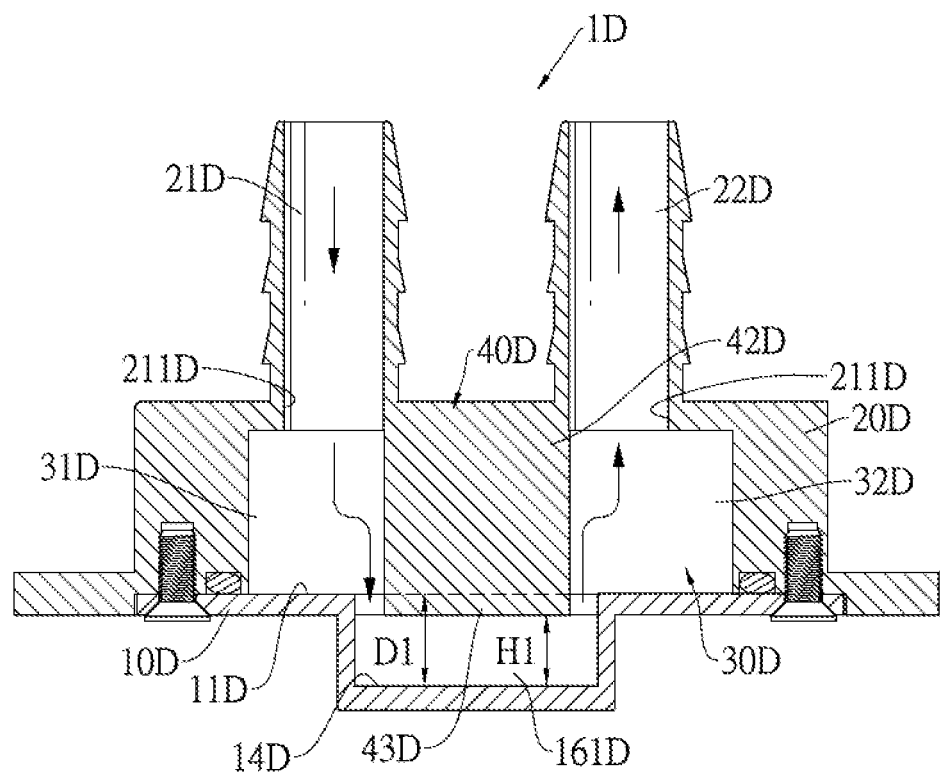
FIG. 11 is a cross-sectional side view of the liquid cooling apparatus in FIG. 10.
Figure 12:
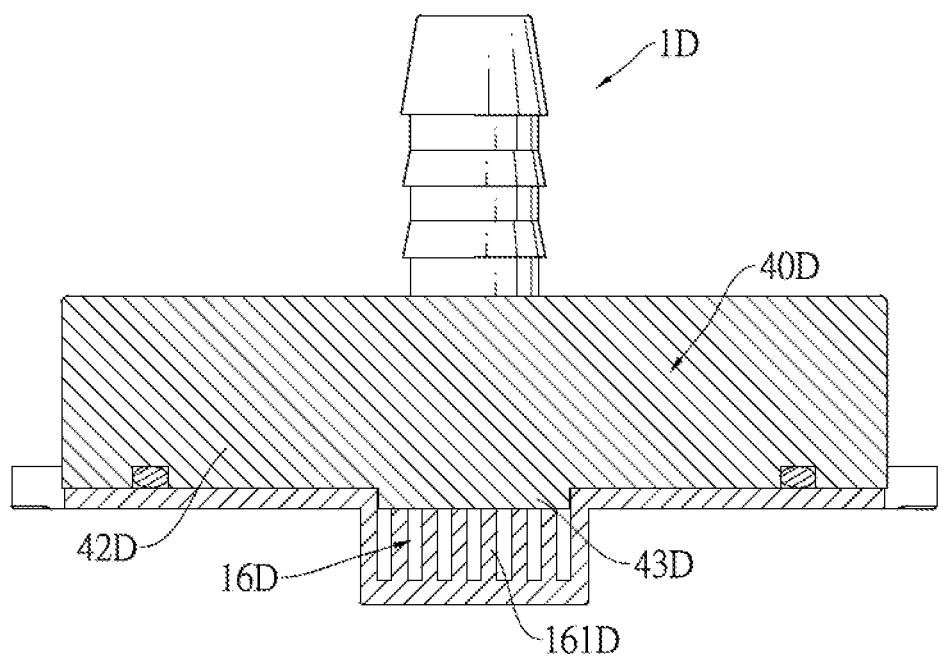
FIG. 12 is another cross-sectional side view of the liquid cooling apparatus in FIG. 10.

With further reference to FIGS. 10 to 12 that shows a fifth embodiment of a liquid cooling apparatus 1D in accordance with the present invention. In the fifth embodiment, the heat dissipating structure 16D includes multiple plate fins 161D. Each of the plate fins 161D has a distal edge. The distal edges of the plate fins 161D form the top of the heat dissipating structure 16D. The distal edge of each of the fins 161D is lower than the upper surface 11D of the chassis 10D, i.e. a height H1 of the plate fin 161D is less than a depth D1 of the recess 14D. The cover 20D has an inner sidewall defined around the inner chamber 30D. The dividing structure 40D corresponds in position to the recess 14D of the chassis 10D and includes a dividing wall 42D and a protruding wall 43D. The dividing wall 42D is disposed between the interior inlet 211D of the liquid inlet channel 21D and the interior outlet 221D of the liquid outlet channel 22D and has two ends and a bottom surface. The two ends of the dividing wall 42D oppositely extend to attach to the inner sidewall of the cover 20D. The bottom surface of the dividing wall 42D faces and abuts the upper surface 11D of the chassis 10D, such that the inner chamber 30D is divided into the liquid inlet compartment 31D and the liquid outlet compartment 32D. The protruding wall 43D protrudes down from the bottom surface of the dividing wall 42D and protrudes into the recess 14D to abut the distal edges of the plate fins 161D.

Figure 13:
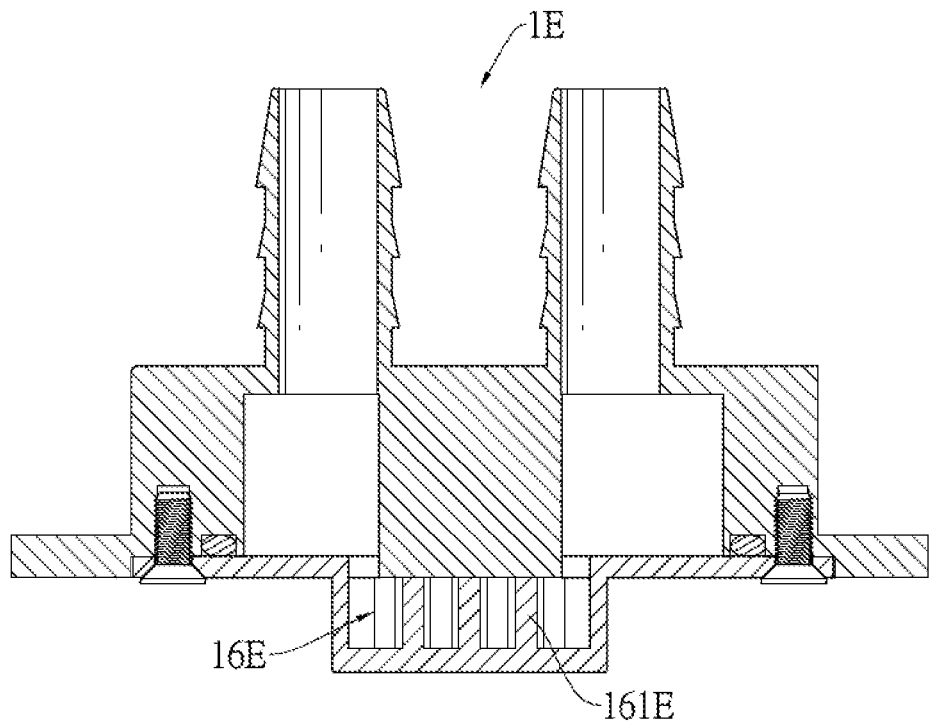
FIG. 13 is a cross-sectional side view of a sixth embodiment of a liquid cooling apparatus in accordance with the present invention.

With further reference to FIG. 13 that shows a sixth embodiment of a liquid cooling apparatus 1E in accordance with the present invention, a configuration of the sixth embodiment is substantially the same as a configuration of the fifth embodiment, except that the heat dissipating structure 16E includes multiple pin fins 162E.

Figure 14:
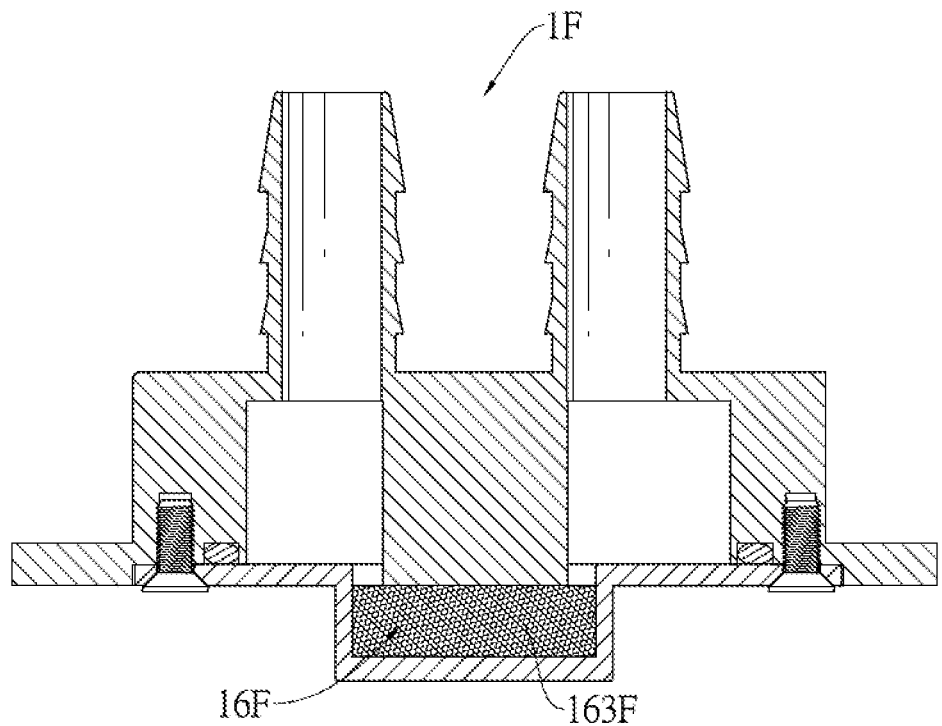
FIG. 14 is a cross-sectional side view of a seventh embodiment of a liquid cooling apparatus in accordance with the present invention.

With further reference to FIG. 14 that shows a seventh embodiment of a liquid cooling apparatus 1F in accordance with the present invention, a configuration of the seventh embodiment is substantially the same as the configuration of the fifth embodiment, except that the heat dissipating structure 16F is formed as a metal foam with multiple pores 163F. Thus, the working fluid can flow through the heat dissipating structure 16F via the pores 163F, so as to dissipate the heat.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A liquid cooling apparatus comprising:
    a chassis having
        an upper surface;
        a lower surface;
        a boss formed on and protruding from the lower surface of the chassis;
        a recess formed in the upper surface of the chassis and recessed into the boss;
        an inner bottom defined in the recess; and
        a heat dissipating structure disposed on the inner bottom in the recess and having a top;
    a cover mounted on the upper surface of the chassis and covering the chassis, wherein an inner chamber is defined between the chassis and the cover, and the cover having
        an inner surface facing the upper surface of the chassis;
        a liquid inlet channel defined through the cover and having an interior inlet communicating with the inner chamber;
        a liquid outlet channel defined through the cover and having an interior outlet communicating with the inner chamber; and
        an inner sidewall defined around the inner chamber;
    a dividing structure disposed in the inner chamber, attached to the inner surface of the cover, and protruding to abut the top of the heat dissipating structure, and the dividing structure corresponding in position to the recess of the chassis and including
        a dividing wall disposed between the interior inlet of the liquid inlet channel and the interior outlet of the liquid outlet channel and having
            two ends oppositely extending to attach to the inner sidewall of the cover; and
            a bottom surface facing and abuts the upper surface of the chassis; and
        a protruding wall protruding down from the bottom surface of the dividing wall and protruding to abut the top of the heat dissipating structure;
    wherein the dividing structure divides the inner chamber into a liquid inlet compartment and a liquid outlet compartment, the liquid inlet compartment directly communicates with the interior inlet of the liquid inlet channel, the liquid outlet compartment directly communicates with the interior outlet of the liquid outlet channel, and the liquid inlet compartment communicates with the liquid outlet compartment via the recess.

2. The liquid cooling apparatus as claimed in claim 1, wherein the heat dissipating structure includes multiple plate fins.

3. The liquid cooling apparatus as claimed in claim 2, wherein
    a height of each of the plate fins is less than a depth of the recess; and
    the two protruding wall protrudes into the recess.

4. The liquid cooling apparatus as claimed in claim 2, wherein each of the plate fins has a distal edge, and the distal edge of each of the plate fins is flush with the upper surface of the chassis.

5. The liquid cooling apparatus as claimed in claim 1, wherein the heat dissipating structure includes multiple pin fins.

6. The liquid cooling apparatus as claimed in claim 1, wherein the heat dissipating structure is formed as a metal foam with multiple pores.

7. The liquid cooling apparatus as claimed in claim 1, wherein an area of a cross-section of the boss is less than 50% of an area of the lower surface of the chassis, and the cross-section of the boss is defined parallel to the lower surface of the chassis.

* * * * *